June 15, 1943.                W. G. SCHEEL                2,321,863
                                DRAG SAW
                         Filed Oct. 15, 1940          2 Sheets-Sheet 1
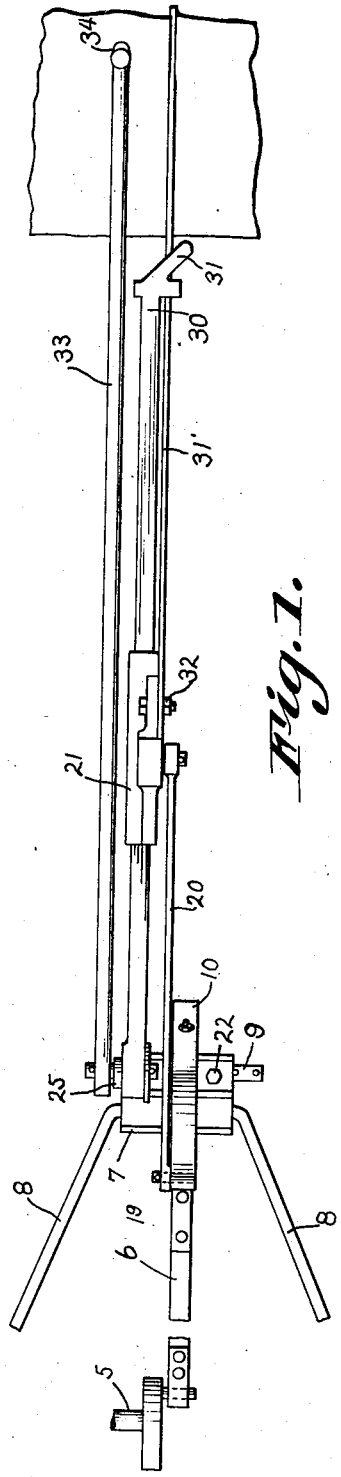
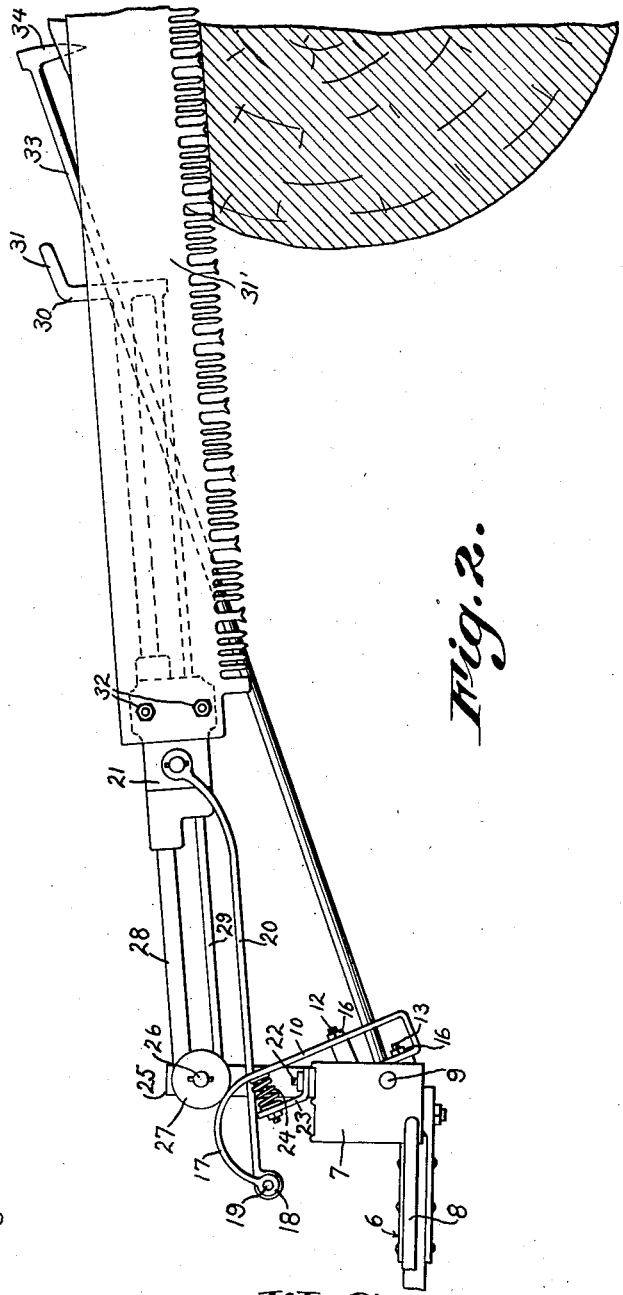
W. G. Scheel
INVENTOR.
BY
ATTORNEYS.

June 15, 1943.  W. G. SCHEEL  2,321,863
DRAG SAW
Filed Oct. 15, 1940  2 Sheets-Sheet 2
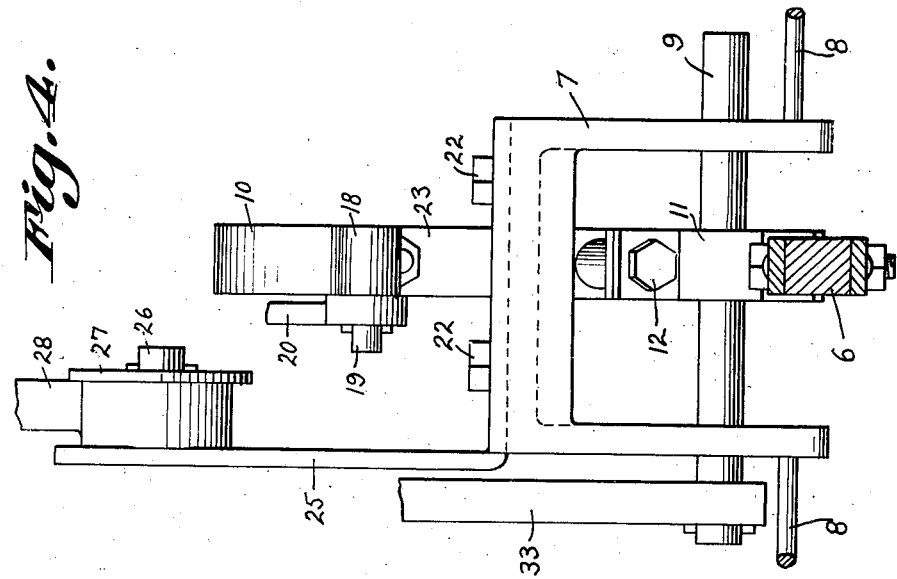
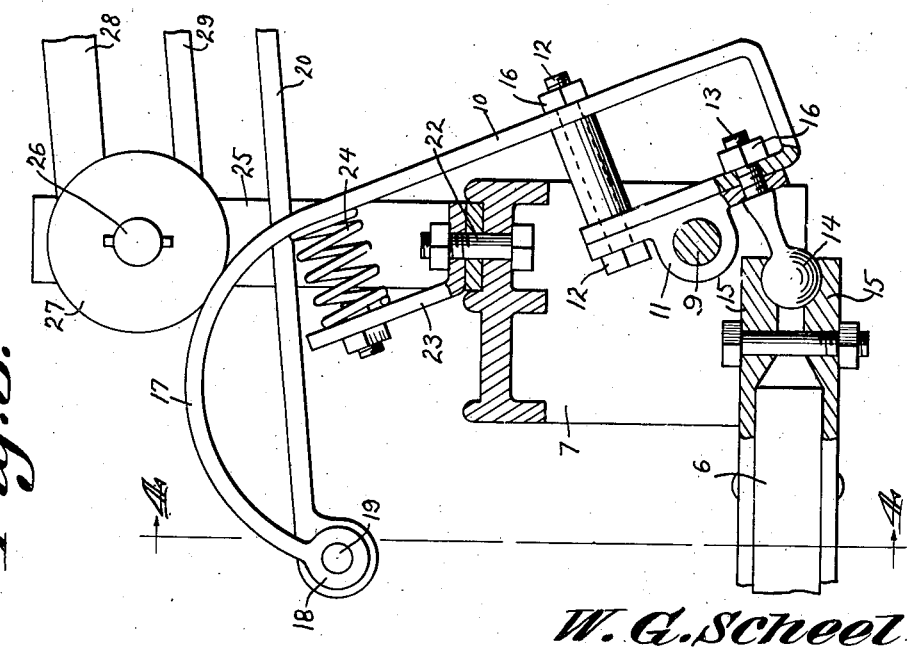
W. G. Scheel
INVENTOR.
BY
ATTORNEYS.

Patented June 15, 1943

2,321,863

UNITED STATES PATENT OFFICE 2,321,863

DRAG SAW

Walter G. Scheel, Tenino, Wash.

Application October 15, 1940, Serial No. 361,306

1 Claim. (Cl. 143—64)

This invention relates to drag saw construction, the primary object of the invention being to provide a drag saw of the portable type, embodying a frame which may be readily and easily connected with a power device, and supported by the power device in such a way that the usual pitman thereof used in driving a mower blade, may be employed in reciprocating the saw blade of the drag saw, to accomplish the purpose of the invention.

An object of the invention is to provide a drag saw embodying a frame which may be readily secured to a power device, the frame providing a support for a saw slide, which is so mounted that the saw will be fed through its work automatically, as the saw is reciprocated.

Another object of the invention is the provision of means to anchor the saw frame with respect to the log being sawed, to insure the proper operation of the saw at all times.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a plan view of a drag saw, constructed in accordance with the invention.

Figure 2 is an elevational view thereof.

Figure 3 is an enlarged detail view illustrating the means for transmitting power from the pitman to the saw blade.

Figure 4 is a sectional view taken on line 4—4 of Figure 3.

Referring to the drawings in detail, the reference character 5 designates the power shaft of a suitable power device, which transmits movement to the pitman 6, forming a part of the power device.

The portable saw, forming the essence of the present invention, embodies a substantially inverted U-shaped supporting frame 7, which is secured in position on the power device, adjacent to the outer end of the pitman 6, as clearly shown by the drawings. Rods 8 connect with the frame 7 and also have connection with the power device to brace the frame 7.

The frame 7 provides a support for the shaft 9 that extends transversely through the frame 7, the shaft 9 providing a support for the arm 10 which is constructed preferably of spring steel, the arm 10 having its lower end shaped to provide a support for the bearing 11 that is bolted thereto, by means of bolts 12 and 13. The bolt 13 is formed with a head 14 that fits between the plates 15 that are formed with recesses to conform to the shape of the head, whereby a ball and socket connection between the arm 10 and pitman 6, is provided. Nuts 16 are provided on the bolts 12 and 13 and hold the bolts in position.

A bolt such as indicated at 13 may be used in lieu of the bolt 12, so that the pitman may be connected to the arm 10 at this point, thereby permitting the device to be connected with various types of machines.

The free end of the arm 10 is curved downwardly and rearwardly as at 17, the end of the arm 10 being formed into a bearing 18 to accommodate the pin 19, carried at one end of the connecting rod 20 which has its forward end pivotally connected to the saw carriage 21, to be hereinafter more fully described. Bolted to the frame 7, by means of the bolt 22, is an upwardly extended plate 23 to which one end of the coiled spring 24 is connected, the opposite end of the coiled spring bearing against one surface of the arm 10, as clearly shown by Figure 3 of the drawings. Thus it will be seen that due to the construction and location of the spring 24, the movements of the arm 10 are cushioned, and excessive jars and shocks incident to the operation of the saw, will be absorbed by said spring.

The bolt 22 also secures the supporting arm 25 to the frame, the arm 25 being extended upwardly, where it provides a support for the pin 26 to which the guide rods forming the saw carriage slide are connected. A washer 27 is secured on the pin 26 to hold the saw carriage slide in position on the pin, in such a way that it may be readily and easily disconnected when it is desired to dismantle the saw.

The saw carriage slide includes an upper rod 28 and a lower rod 29, the rods being spaced apart and having their outer ends connected by means of the bar 30 that terminates in a hand grip 31 whereby the carriage may be lifted.

The reference character 31' designates the saw blade, which is bolted to the saw carriage 21, by means of the bolts 32. This saw carriage 21 is formed with bearings to receive the rods 28 and 29 to allow free sliding movement of the saw carriage thereover.

An anchor rod indicated at 33 is connected with the shaft 9, and is adapted to pivot thereon. The outer end of the anchor rod 33 carries a spike 34 which may be driven into the log to be sawed, thereby holding the saw frame in its proper position with respect to the log or work, thereby insuring against twisting of the saw frame, while in operation.

From the foregoing it will be seen that due to the construction shown and described, I have provided a portable saw frame for a drag saw, which may be readily and easily mounted on a power device which is provided with the usual pitman for reciprocating a cutter bar or the like.

After the device has been properly attached, it is obvious that as the pitman operates, the arm 10 will be rocked on its shaft, transmitting reciprocatory movement to the saw blade, through the carriage 21 and connecting rod 20. As the saw cuts into the log or work, the weight of the carriage 21 will tend to feed the saw through the log.

In view of the foregoing detail description, it is believed that a further detail disclosure as to the operation of the saw is unnecessary.

What is claimed is:

In a drag saw, a pitman and a connecting rod, a frame, a shaft on the frame, an arm adapted to connect the pitman and the connecting rod, said arm being constructed of spring steel material, one end of the arm being extended rearwardly upon itself and spaced from the main portion of the arm, a bolt connecting the rearwardly extended portion of the arm to the main portion of the arm, a bearing mounted on the rearwardly extended portion of the arm, said bearing being mounted on the shaft, means for connecting the pitman to the rearwardly extended portion of the arm, one end of the arm being curved rearwardly above the pitman, and means for connecting the rearwardly curved end of the arm to the saw connecting rod.

WALTER G. SCHEEL.